United States Patent [19]
Baldwin et al.

[11] Patent Number: 5,629,380
[45] Date of Patent: May 13, 1997

[54] EPOXY ADHESIVE COMPOSITION COMPRISING A CALCIUM SALT AND MANNICH BASE

[75] Inventors: John M. Baldwin, Hugo; Janis Robins, St. Paul, both of Minn.

[73] Assignee: Minnesota Mining and Manufacturing Company, St. Paul, Minn.

[21] Appl. No.: 529,983

[22] Filed: Sep. 19, 1995

Related U.S. Application Data

[63] Continuation-in-part of Ser. No. 459,293, Jun. 2, 1995, abandoned, which is a continuation of Ser. No. 308,390, Sep. 19, 1994, abandoned.

[51] Int. Cl.$^6$ ................................................ C08L 63/00
[52] U.S. Cl. .................. 525/113; 525/65; 525/902; 528/92; 528/93; 427/386; 156/330
[58] Field of Search .................. 525/113, 65, 902; 528/93, 92; 427/386; 156/330

[56] References Cited

U.S. PATENT DOCUMENTS

| | | | |
|---|---|---|---|
| 3,256,135 | 6/1966 | Weinheimer et al. | 161/185 |
| 3,257,342 | 6/1966 | Kwong | 260/18 |
| 3,492,269 | 1/1970 | Janssen et al. | 260/47 |
| 3,496,250 | 2/1970 | Czerwinski | 260/836 |
| 3,586,616 | 6/1971 | Kropp | 204/159.11 |
| 3,842,019 | 10/1974 | Kropp | 260/2 EP |
| 3,907,706 | 9/1975 | Robins | 252/431 |
| 4,668,736 | 5/1987 | Robins et al. | 525/65 |
| 4,704,331 | 11/1987 | Robins et al. | 428/414 |
| 4,728,384 | 3/1988 | Goel | 156/307.3 |
| 5,001,193 | 3/1991 | Golden | 525/109 |
| 5,198,146 | 3/1993 | Shomer | 252/182.24 |
| 5,470,896 | 11/1995 | Wegmann et al. | 523/428 |

FOREIGN PATENT DOCUMENTS

| | | |
|---|---|---|
| 0471988A2 | 2/1992 | European Pat. Off. . |
| 0488949A2 | 6/1992 | European Pat. Off. . |
| 0604363A2 | 6/1994 | European Pat. Off. . |

*Primary Examiner*—Frederick Krass
*Attorney, Agent, or Firm*—Gary L. Griswold; Waltner N. Kirn; Scott A. Bardell

[57] ABSTRACT

A curable, structural epoxy adhesive composition comprising two parts is provided. The first part comprises an amine curing agent and a catalyst; the second part comprises an epoxy resin having an average epoxide functionality of greater than one.

14 Claims, No Drawings

EPOXY ADHESIVE COMPOSITION COMPRISING A CALCIUM SALT AND MANNICH BASE

This application is a continuation-in-part of U.S. Ser. No. 08/459,293, filed Jun. 2, 1995, now abandoned, which is a continuation of U.S. Ser. No. 08/308,390, filed Sep. 19, 1994, now abandoned, the contents of each of which are hereby incorporated by reference.

FIELD OF THE INVENTION

The present invention relates to a thermally curable two part epoxy composition. The invention also relates to a two part epoxy adhesive made from the epoxy composition.

BACKGROUND OF THE INVENTION

Epoxy compositions are used widely in industry as adhesives, paints, and coatings for a number of applications. Epoxy adhesives are particularly useful for bonding metal surfaces together to provide strong structural bonds. Structural epoxy adhesives have replaced spot welding and other methods of mechanical fastening in many industrial applications, such as in automotive assembly plants.

In some applications, it is often desirable to induction cure an epoxy adhesive composition for a short period of time so that the adhesive develops a green strength sufficient to bond metal surfaces. The induction cure generally involves a short exposure to radio frequency energy, on the order of magnitude of less than a minute, and often less than about 10 seconds, which generates heat in the metal parts to start the curing reaction. During this time, the epoxy adhesive catalyst needs to be activated to start the curing of the adhesive. Curing of the adhesive to its final state, i.e., a structural adhesive, is usually done in a subsequent oven bake.

Catalysts which have sufficient reactivity for induction curing often have a very limited pot life; other catalysts may not effect sufficient curing to build the desired green strength during the induction heating cycle. It is desirable for the epoxy adhesive to build a strong, robust bond to the metal surface, usually through an oily coating of a mill oil, cutting fluid, draw oil, or a combination thereof. A bond is referred to as robust if the bond breaks apart cohesively at high shear values when tested in an overlap shear test. The bonds may break in three different modes: (1) the adhesive splits apart, leaving portions of the adhesive adhered to both metal surfaces in a cohesive failure mode; (2) the adhesive pulls away from either metal surfaces in an adhesive failure mode, or (3) a combination of adhesive and cohesive failure. Optimally, the adhesive fails in either the cohesive failure mode, or a combination of adhesive and cohesive failure.

There remains an ongoing need for improved epoxy adhesives that build robust, cohesive failure bonds to oily metals.

SUMMARY OF THE INVENTION

The present invention provides an epoxy catalyst comprising:

(i) an inorganic metal salt; and (ii) an epoxy polymerization catalyst. In a preferred embodiment the epoxy catalyst comprises a calcium salt and a non-sterically hindered tertiary amine such as dimethylbenzyl amine, dimethyl octyl amine, tributyl amine, diazobicyclo-(2,2,2)-octane and tris-2,4,6,-(dimethylaminomethyl)phenol.

The invention also provides an amine curing agent for epoxy resins comprising:

(i) the epoxy catalyst; and (ii) an amine curing agent.

The invention also provides a two-part amine curing epoxy composition that is capable of bonding to oily metal surfaces to form robust, structural bonds, comprising:

(I) a first part comprising:

an epoxy resin curing agent comprising:

(i) a catalytically effective amount of the epoxy catalyst having an inorganic metal salt; and an epoxy homopolymerization catalyst; and (ii) an amine curing agent; and (II) a second part comprising an epoxy resin having an average epoxide functionality of greater than one.

Preferably, the adhesive composition further includes a toughening agent compatible with the epoxy composition.

The present invention also provides a method of adhering to an oily metal substrate comprising applying a curable, structural epoxy adhesive composition to an oily metal substrate.

DETAILED DESCRIPTION

The epoxy compositions of the invention are provided in a two part system in which the first part comprises a catalyst and an amine curing agent, and the second part comprises the epoxide.

The catalyst of the invention comprises a metal salt and a compound that is effective in lowering the first peak exotherm on curing of the epoxy composition as determined on a differential scanning calorimeter (DSC) at a heating rate of 20° C. per minute. Preferably, the first peak exotherm is lowered by at least 20° C. and more preferably by at least 35° C. as compared to compositions having only the metal salt, only the catalyst, or neither. Preferably, the curing agent will also effect a lowering of the second peak exotherm temperature, and most preferably, the second peak exotherm is lowered to less than about 250° C.

The invention provides a method of adhering to an oily metal substrate comprising applying a curable, structural epoxy adhesive composition to an oily metal substrate, wherein said curable, structural epoxy adhesive composition comprises two parts, the first part comprising:

(a) an epoxy catalyst comprising:

(i) a $Ca^{+2}$ salt; and (ii) an epoxy polymerization catalyst having the structure of formula (I):

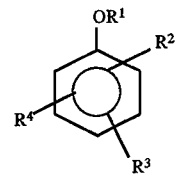

wherein $R^1$ is H or —$CH_3$ $R^2$ is —$CHNR^5R^6$ and $R^5$ and $R^6$ are independently selected from —$CH_3$ and —$CH_2CH_3$;

$R^3$ and $R^4$ independently may be present or absent, when present $R^3$ and $R^4$ are —$CHNR^5R^6$ and $R^5$ and $R^6$ are independently selected from —$CH_3$ and —$CH_2CH_3$; and (b) an amine curing agent; and the second part comprising an epoxy resin having an average epoxide functionality of greater than one. In one embodiment, $R^1$ is H; in another $R^2$ is —$CHN(CH_3)_2$, and in a third $R^3$ and $R^4$ are present and each of $R^2$, $R^3$, and $R^4$ is —CHN(CH₃)₂. In another embodiment, the structure of formula (I) is tris 2,4,6-(dimethylaminomethyl)phenol. In a preferred embodiment, every epoxy polymerization catalyst that is present in the composition has the structure of formula (I).

In one embodiment, the adhesive composition has an overlap shear strength as measured by the test method Initial Shear Strength After Induction Heating for Examples 3 and 19 (described below) of at least 0.2 MPa after induction cure plus 1 hour of room temperature cure; in a preferred embodiment the overlap shear strength is at least 0.5 MPa.

In another embodiment, the adhesive composition has an overlap shear strength as measured by the test method Lap Shear Strength (described below) of at least 9 MPa and cohesive failure after oven cure; in another embodiment, the overlap shear strength is at least 11 MPa with cohesive failure; and in another embodiment the overlap shear strength is at least 15 MPa with cohesive failure.

In one embodiment, the stoichometric amine to epoxy ratio of the amine curing agent to the epoxy resin is from 0.2 to 0.9; in a preferred embodiment the stoichometric amine to epoxy ratio of the amine curing agent to the epoxy resin is from 0.3 to 0.7.

The invention provides a method of adhering to an oily metal substrate comprising applying a curable, structural epoxy adhesive composition to an oily metal substrate, wherein said curable, structural epoxy adhesive composition comprises two parts, the first part comprising:

(a) an epoxy catalyst comprising:
  (i) a $Ca^{+2}$ salt; and
  (ii) diazobicyclo(2,2,2)-octane as an epoxy polymerization catalyst; and
(b) an amine curing agent; and
the second part comprising an epoxy resin having an average epoxide functionality of greater than one.

Useful metal salts include compounds having as the metal ion, $Ca^{+2}$, $Mg^{+2}$, $Bi^{+3}$, $Ce^{+3}$, $Fe^{+3}$, $Pb^{+1}$, $Cu^{+2}$, $Co^{+2}$, $La^{+3}$, $Li^{+1}$, $In^{+3}$, $Th^{+4}$, $Be^{+2}$, $Ba^{+2}$, $Sr^{+2}$, and $Zn^{+2}$. Preferably, the metal ion is $Ca^{+2}$, $Mg^{+2}$, or $La^{+3}$; in a more preferred embodiment, the metal ion is $Ca^{+2}$. Counter ions in the metal salts that have proven useful include $NO_3$, $CF_3SO_3$, $ClO_4$, $BF_4$, $CH_3C_6H_4SO_3$, and $SbF_6$, with $NO_3$, $CF_3SO_3$, $CH_3C_6H_4SO_3$, and $ClO_4$ being preferred.

In the practice of the invention, an amine curing agent is used in an amount sufficient to cure the epoxy adhesive composition. This amount is an approximate stoichiometric amount based on the type of epoxy resin used. Useful stoichometric ratios of amine:epoxy range from about 0.2 to about 0.9. The amount typically ranges from about 5 to 200 parts by weight of curing agent per 100 parts of the total amount of epoxide used.

Suitable base curing agents include polyamide resins, aliphatic amines, polyether diamines, aromatic amines, and mercaptan resins. Specific examples of base curing agents are the Ancamide™ Series of products, commercially available from Air Products and Chemical Company, and the Scherex Series, commercially available from Schering-Berling.

Also useful are polyaminopolyamide, also referred to as polyamido amine, curing agents, which are commercially available or may be prepared as disclosed in U.S. Pat. No. 3,257,342 (Kwong). The curing agents disclosed in U.S. Pat. No. 3,257,342 (Kwong) are amino-terminated polyamides that are the reaction product of a diaminopolyether and a polycarboxylic acid. Preferred carboxylic acids include dimer fatty acids or a mixture of dimer and trimer fatty acids. These carboxylic acids are available from Henkle Corporation under the Empol™ tradename, and include Empol™1022, Empol™1018, and Empol™1014.

The polyamidoamines can also be prepared as follows:
(1) Charge the acid to a reactor and heat to about 75° C. to about 100° C. under a low vacuum of about −28 inches Hg.
(2) Charge amine to the reactor under reduced pressure.
(3) Add nitrogen to bring reactor to atmospheric pressure.
(4) Heat slowly to about 175° C., distilling the water of reaction during heating.
(5) At about 175° C. to about 200° C., apply a vacuum of about −25 to about −40 inches Hg and distill for about an hour.
(6) Add nitrogen to bring reactor to atmospheric pressure and discharge product.

Epoxides useful in the practice of the invention can be any organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, or mixtures thereof. The preferred epoxides are aromatic and contain more than 1.5 epoxy groups per molecule and preferably 2 or more epoxy groups per molecule.

The useful materials have a molecular weight of about 150 to 10,000 and preferably from about 300 to 1,000. Useful materials include linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendant epoxy groups (e.g., a glycidyl methacrylate polymer or copolymer), and mixtures thereof.

Useful epoxide-containing materials include compounds of the general Formula II:

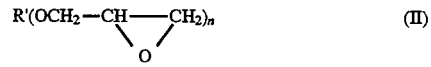

$$R'(OCH_2-CH\underset{O}{\overset{}{\diagdown\diagup}}CH_2)_n \quad (II)$$

wherein:

R' is alkyl, alkyl ether, or aryl, preferably aryl and n is an integer between 2 and 6. Preferred are aromatic glycidyl ethers such as those prepared by reacting a polyhydric phenol with an excess of epichlorohydrin. Examples of useful phenols include resorcinol, catechol, hydroquinone, and the polynuclear phenols including p,p'-dihydroxydibenzyl, p,p'-dihydroxydiphenyl, p,p'-dihydroxydiphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, dihydroxydiphenyldicyclohexylmethane, and dihydroxydiphenylcyclohexane. Also preferred are polyhydric phenolic formaldehyde condensation products as well as polyglycidyl ethers that contain as reactive groups only epoxy groups or hydroxy groups.

Compounds of the above general Formula II, but wherein n=1, are also useful as optional additives in the composition of the instant invention.

Further, the useful materials for the invention include diglycidyl ethers of the bisphenol A and of novolak resins, such as described in "Handbook of Epoxy Resins" by Lee and Nevill, McGraw-Hill Book Co., New York (1967). Epoxides with flexibilized backbones are also useful. Preferred materials include diglycidyl ethers of bisphenol A and diglycidyl ethers of bisphenol F, and most preferably diglycidyl ethers of bisphenol A, because of the desirable structural adhesive properties that these materials attain upon curing.

Examples of commercially available epoxides useful in the invention include diglycidyl ethers of bisphenol A (e.g., those available under the trademarks Epon 828, Epon 1001, and Epon 1310 from Shell Chemical Co., and DER-331, DER-332, and DER-334, available from Dow Chemical Co.); diglycidyl ethers of bisphenol F (e.g., Epiclon™830, available from Dai Nippon Ink and Chemicals Inc.); silicone resins containing diglycidyl epoxy functionality; flame retardant epoxy resins (e.g., DER 580, a brominated bisphenol type epoxy resin available from Dow Chemical Co.); and 1,4-butanediol diglycidyl ethers.

The toughening agents which are useful in the present invention include polymeric compounds having both a rubbery phase and a thermoplastic phase, such as graft copolymers having a polymerized diene rubbery core and a polyacrylate or polymethacrylate shell; graft copolymers having a rubbery core with a polyacrylate or polymethacrylate shell; and elastomeric particles polymerized in situ in the epoxide from free-radical polymerizable monomers and a copolymeric stabilizer.

Specific examples of useful toughening agents include graft copolymers having a polymerized diene rubbery backbone or core which is grafted to a shell of an acrylic acid ester or methacrylic acid ester, monovinyl aromatic hydrocarbon, or a mixture thereof, such as disclosed in U.S. Pat. No. 3,496,250, incorporated herein by reference. Preferable rubbery backbones comprise polymerized butadiene or a polymerized mixture of butadiene and styrene. Preferable shells comprising polymerized methacrylic acid esters are lower alkyl ($C_1$–$C_4$) substituted methacrylates. Preferable monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0° C., such as polybutyl acrylate or polyisooctyl acrylate to which is grafted a polymethacrylate polymer (shell) having a $T_g$ about 25° C., such as polymethylmethacrylate.

Still further examples of toughening agents useful in the invention are elastomeric particles that have a $T_g$ below about 25° C. and have been polymerized in situ in the epoxide before mixing with the other components of the composition. These elastomeric particles are polymerized from free-radical polymerizable monomers and a copolymerizable polymeric stabilizer that is soluble in the epoxide. The flee-radical polymerizable monomers are ethylenically unsaturated monomers or diisocyanates combined with co-reactive difunctional hydrogen compounds such as diols, diamines, and alkanolamines. Examples of these elastomeric particles are disclosed in U.S. Pat. No. 4,525,181. These particles are commonly referred to as "organosols".

Still other toughening agents are rubber modified liquid epoxy resins. An example of such a resin is Kraton™RP6565 Rubber available from Shell Chemical Company. The modified epoxy resin is made from 85% by weight Epon™828 and 15% by weight of a Kraton™ rubber. The Kraton™ rubbers are known in the industry as elastomeric block copolymers.

A further class of toughening agents includes rubbery copolymers that have reactive functional groups, such as amine terminated butadiene copolymers.

The toughening agent is preferably used in an amount equal to about 3 to 35 parts by weight, and more preferably about 5 to 15 parts by weight per 100 parts by weight of the epoxy resin. The toughening agents of the present invention add strength to the composition after curing without interfering with curing of the epoxide.

In some cases reactive diluents may be added to control the flow characteristics of the adhesive composition. Suitable diluents have at least one reactive terminal end portion and preferably, a saturated or unsaturated cyclic backbone. Preferred reactive terminal ether portions include glycidyl ether and vinyl ether. Examples of suitable diluents include the diglycidyl ether of resorcinol, diglycidyl ether of cyclohexane dimethanol, diglycidyl ether of neopentyl glycol, triglycidyl ether of trimethylolpropane dipentene, and the divinyl ether of cyclohexanedimethanol. Commercially available reactive diluents are "WC-68" from Rhone Poulenc, and Rapicure™ CHVE, a divinyl ether of cyclohexanedimethanol available from Allied-Signal Corp. of Morristown, N.J.

Various other adjuvants can be added to the epoxide composition to enhance properties of the composition before and after curing.

Also included among useful adjuvants are nonreactive diluents; plasticizers such as conventional phosphates and phthalates; thixotropic agents such as fumed silica to provide flow control; pigments to enhance color tones such as ferric oxide, brick dust, carbon black, and titanium dioxide; fillers such as talc, silica, magnesium, calcium sulfate, beryllium aluminum silicate; clays such as bentonite; glass and ceramic beads and bubbles; and reinforcing materials, such as woven and nonwoven webs of organic and inorganic fibers such as polyester, polyimide, glass fibers, and ceramic fibers. The adjuvants can be added in an amount effective for the intended purpose; typically, amounts up to about 50 parts of adjuvant per total weight of formulation can be used.

The epoxy composition of the present invention may be formulated in a variety of ways. By providing a two-part composition, in which the first part contains all of the catalyst components, with the two parts being combined prior to use of the composition, desirable shelf-life or pot-life of the composition is obtained. In some applications, it is desirable to select the amounts and the distribution of the ingredients in each part to provide viscosity control and better mixing of the two parts. For example, the fillers can be divided so that each part contains a portion of the fillers used.

The epoxy compositions of the present invention can be cured by any means which allow sufficient heat to start the curing reaction. The means can include ambient temperature, conventional ovens, induction heating, infrared radiation, microwave radiation, immersion into liquid baths, or any combination thereof. Typically, the final curing is conducted at a temperature in the range of about 50° C. to about 200° C. for a time ranging from about 1 second to about 2 hours. The curing time will depend upon the particular process for curing. Induction heating times typically range from about 1–60 seconds while oven curing times can range from about 0.1 to about 2 hours.

The epoxy adhesive of the present invention can be used for bonding metal to metal, plastic to plastic, and plastic to metal. Examples of metal surfaces include steel, titanium, oily steel, aluminum, and magnesium. Plastic surfaces include polyethylene, polycarbonate, polyester, polyurethane, and ureaformaldehyde. The epoxy adhesive can be used in assembling parts such as for automobiles, aircraft, refrigeration units, etc.

The following non-limiting examples serve to further illustrate the present invention in greater detail.

REACTIVITY OF THE ADHESIVE

The reactivity of the adhesive is a measure of how quickly the adhesive is cured when heated.

The reactivity is determined on a differential scanning calorimeter (DSC Model 912 available from DuPont). Approximately 10–15 milligrams of the adhesive is placed in the DSC and heated from 30° C. to 350° C. at a heating rate of 20° C. per minute.

The test results are plotted in a graph of heat flow in Watts/gram vs temperature in degrees C. From the plots, the following information is recorded:

(A) Number of peaks generated;

(B) Maximum exotherm temperatures from each peak; and (C) Area under each curve (joules/gram)

(D) Total area under both curves (J/gram)

INITIAL LAP SHEAR STRENGTH AFTER INDUCTION HEATING FOR EXAMPLE 1

This test is a measure of the green strength that develops after an induction heating cycle. A test sample is prepared by applying the adhesive to 2.54 cm by 10.16 cm overlapping oily steel strips and curing as detailed below. The metal strips are 0.85 mm thick G-60HDES (hot dipped extra smooth galvanized steel) available from ACT. The strips are prepared for testing by wiping with methyl ethyl ketone and covering with Quaker 61-MAL-HCL-1 from Quaker Chemical Co. draw lubricant at a coating weight of 400 milligrams per square foot. The strips are left at room temperature for at least 20 minutes before testing.

The adhesive composition (mixed in a volume ratio of 2 parts B to 1 part A) is mixed with about 1% glass beads ("Microbead™ 1402 Class IV Engineering Grade", available from Cataphote, Inc.) to provide a 0.25 mm thick bond. The adhesive is then applied, within 30 minutes of mixing, to a 1.27 cm area on one end of one strip of metal, and a second strip of metal is placed so that 1.27 cm of one end of the second strip overlaps the adhesive, and with the uncoated ends of each strip extending in opposing directions. The strips are clamped together and the test sample is induction cured in a Miller Induction Heating System available from Miller Electric Manufacturing Co., Appleton, Wis. The system includes a model IHPS5 10-5 Induction Heating power system, a model IHCA 25-50 induction heating controller, and a Radiator 1A cooling system. The sample is placed in the induction heating unit, heated for 4 seconds with the induction heating coil to achieve a bondline temperature of about 275° C., and held at room temperature for the specified time, i.e., 15 minutes, 30 minutes, 60 minutes, or 24 hours before testing (Reported as "Induction Cure+15 minutes", etc.).

The test is conducted at room temperature on an Instron™ tester with a jaw separation speed of 1.27 mm per minute with a 5.08 mm jaw gap. The data is reported in MegaPascals (MPa) and represents an average of at least three test samples from the composition. The mode of failure is also noted as adhesive, (A), wherein the adhesive pulls cleanly away from the metal strip, cohesive, (C), wherein the adhesive splits and part of the adhesive is left on each of the metal strips, or mixed, (M), wherein the failure mode is partly adhesive and partly cohesive.

EXAMPLES

Example 1

Part A of a 2-part adhesive composition was prepared by mixing 40 parts of an amine-terminated polyamide (the reaction product of a diamine having the formula:

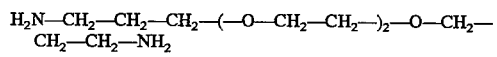

and a dimer acid mixture (Empol™1014 available from Henkel Corp) in a 2:1 equivalents ratio), 6.0 parts 4,7,10-trioxatridecane 1,3-diamine (H221 available from BASF), 8.0 parts 2,4,6-tri dimethylaminomethyl phenol CK-54 available from Anchor Corp.), 2.0 parts calcium nitrate, 2.5 parts imidazole, and heating to about 175° to 200° F. to form a solution. The solution was cooled to below about 43° C. and 16.0 parts amine terminated butadiene rubber (ATBN 1300×16 available from B. F. Goodrich Co.) were added. The rubber can be heated as needed to a temperature below about 43° C. to enhance dispersion. Also added were 20 parts amorphous silicon dioxide (GP-71, available from Harbison-Walker Corp.) and 3.0 parts fumed silica (Cab-O-Sil™ TS-720, available from Cabot Corp.) using a high shear mixer.

Part B of the 2-part epoxy adhesive composition was prepared by mixing together 15 parts of methacrylate butadiene styrene terpolymer (Paraloid™EXL2691, available from Rohm & Haas Co.) with 80 parts of a diglycidyl ether of bisphenol A (Epon™828, available from Shell Chemical Co.) and heating at about 80° C. for about 60 minutes with constant stirring. As the mixture was cooling, 20 parts diglycidyl ether of cyclohexanedimethanol were added (Heloxy MK 107 made by Rhone Poulenc). The mixture was then cooled to about room temperature and the following were added and mixed with a high shear mixer: 2.5 parts epoxy silane (Z-6040 available from Union Carbide, Inc.), 2.0 parts fumed silica (Cab-O-Sil™TS-730), 3.0 parts glass beads having a nominal particle size of about 0.25 mm (available from Cataphote, Inc.), 20 parts amorphous silicon dioxide (GP-71) and 19.7 parts glass bubbles (B37/2000 available from Minnesota Mining and Manufacturing Co.), and 5.0 parts of calcium ion-exchanged silica gel (SHIELDEX™AC5, available from W. R. Grace & Co.).

An adhesive composition was prepared by mixing a 2:1 volume ratio of Part B:Part A, and tested for induction cure strength as detailed above. Test results are shown in Table 1.

TABLE 1

| EXAMPLE 1 | Induction Cure Strength (MPa)/Failure Mode |
| --- | --- |
| Induction Cure + 15 minutes | 13/C |
| Induction Cure + 30 minutes | 12/C |
| Induction Cure + 60 minutes | 12/C |
| Induction Cure + 24 hours | 19/C |

INITIAL LAP SHEAR STRENGTH AFTER INDUCTION HEATING FOR EXAMPLES 3 AND 19

This test is a measure of the green strength that develops after an induction heating cycle. A test sample is prepared by applying the adhesive to 2.54 cm by 10.16 cm overlapping oily steel strips and curing as detailed below. The metal strips are 0.85 mm thick G-60HDES (hot dipped extra smooth galvanized steel) available from ACT. The strips are prepared for testing by wiping with methyl ethyl ketone and covering with Novamax FB27-MC-1 from Novamax Chemical Co., draw lubricant at a coating weight of 1,500 milligrams per square foot. The strips are left at room temperature for at least 30 minutes before testing.

The adhesive composition mixed in a weight ratio to achieve the desired amine to epoxy stoichiometry contains about 1% glass beads ("Microbead™ 1402 Class IV Engineering Grade" available from Cataphote, Inc.) to provide a 0.25 mm thick bond. The adhesive is then applied, within 30 minutes of mixing, to a 1.27 cm area on one end of one strip of metal, and a second strip of metal is placed so that 1.27 cm &one end of the second strip overlaps the adhesive, and with the uncoated ends of each strip extending in opposing directions. The strips are clamped together and the test sample is induction cured in a Miller Induction Heating System available from Miller Electric Manufacturing Co., Appleton, Wis. The system includes a model IHPS5 10-5 Induction Heating power system, a model IHCA 25-50 induction heating controller, and a Radiator 1A cooling system. The sample is placed in the induction heating unit, heated for 5 seconds with the induction heating coil to achieve a bondline temperature of about 121° C., and held at room temperature for a specified time, i.e., 15 minutes, 30 minutes, 60 minutes, or 24 hours before testing (Reported as "Induction Cure +15 minutes", etc.).

Example 3 had a lap shear strength of 0 and Example 19 had a lap shear strength of 1.4 MPa after induction cure at 121C for 5 seconds and a 15 minute dwell at room temperature.

LAP SHEAR STRENGTH

This test is a measure of the shear strength of an adhesive after final curing. The mixed adhesive composition is applied to oily metal coupons as described above and then allowed to cure at room temperature overnight. The next day, the bonded assemblies are each oven cured at 163° C. for 20 minutes. The bonds are allowed to equilibrate to room temperature and then tested for overlap shear as described below.

The test is conducted at room temperature on an Instron™ tester with a jaw separation speed of 1.27 cm per minute with a 5.08 cm jaw gap. The data is reported in megaPascals (MPa) and represents an average of at least three test samples from the composition. The mode of failure is also noted as adhesive, (A), wherein the adhesive pulls cleanly away from the metal strip, cohesive, (C), wherein the adhesive splits and part of the adhesive is left on each of the metal strips, or mixed, (M), wherein the failure mode is partly adhesive and partly cohesive.

Example 2

Part A of a 2-part adhesive composition was prepared by mixing 40 parts of an amine-terminated polyamide (the reaction product of a diamine having the formula:

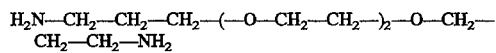

and a dimer acid mixture (Empol™1014 available from Henkel Corp) in a 2:1 equivalents ratio), 6.0 parts 4,7,10-trioxatridecane-1,3-diamine (H221 available from BASF) to form a solution. Then 16.0 parts amine terminated butadiene rubber (ATBN 1300×16 available from B. F. Goodrich Co.). The rubber can be heated as needed to a temperature below about 45° C. to enhance dispersion. Also added were 5 parts amorphous silicon dioxide (GP-71, available from Harbison-Walker Corp.) and 1.0 parts fumed silica (Cab-O-Sil™ TS-720, available from Cabot Corp.) using a high shear mixer.

Part B of the 2-part epoxy adhesive composition was prepared by mixing together 15 parts of methacrylate butadiene styrene terpolymer (Paraloid™EXL2691, available from Rohm& Haas Co.) with 80 parts of a diglycidyl ether of bisphenol A (Epon™828, available from Shell Chemical Co.) and heating at about 80° C. for about 60 minutes with constant stirring. As the mixture was cooling, 20 parts diglycidyl ether of cyclohexanedimethanol (Heloxy MK 107 made by Rhone Poulenc). The mixture was then cooled to about room temperature and the following were added and mixed with a high shear mixer: 3.0 parts glass beads having a nominal particle size of about 0.25 mm (available from Cataphote, Inc.), and 10 parts amorphous silicon dioxide (GP-71).

An adhesive composition was prepared by mixing a 1:1.8 weight ratio of Part A:Part B. The amine/epoxy ratio was 0.6. The adhesive was tested for Reactivity and Lap Shear Strength according to test procedures described above. Test results are shown in Table 2.

Examples 3–4

Part A of a 2-part adhesive composition was prepared by mixing 40 parts of an amine-terminated polyamide (the reaction product of a diamine having the formula:

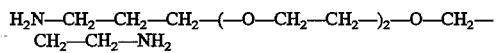

and a dimer acid mixture (Empol™1014 available from Henkel Corp) in a 2:1 equivalents ratio), 6.0 parts 4,7,10-trioxatridecane 1,3-diamine (H221 available from BASF), and 8.0 parts tris-2,4,6-(dimethylaminomethyl)phenol (K-54 available from Anchor Corp.) to form a solution. Then 16.0 parts amine terminated butadiene rubber (ATBN 1300×16 available from B. F. Goodrich Co.) were added. The rubber can be heated as needed to a temperature below about 45° C. to enhance dispersion. Also added were 5 parts amorphous silicon dioxide (GP-71, available from Harbison-Walker Corp.) and 1.0 parts fumed silica (Cab-O-Sil™ TS-720, available from Cabot Corp.) using a high shear mixer.

Epoxy adhesive compositions were prepared as described in Example 2. Example 3 had an amine/epoxy ratio of 0.6 and the adhesive was prepared by mixing a 1:1.8 weight ratio of Part A:Part B. Example 4 had an amine/epoxy raio of 0.3 and the adhesive was prepared by mixing a 1:3.6 weight ratio ofPartA:Part B. The adhesives were tested as in Example 2 and test results are shown in Table 2.

Examples 5–6

Part A of a 2-part adhesive composition was prepared by mixing 40 parts of an amine-terminated polyamide (the reaction product of a diamine having the formula:

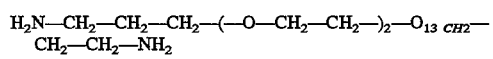

and a dimer acid mixture (Empol™1014 available from Henkel Corp) in a 2:1 equivalents ratio), 6.0 parts 4,7,10-trioxatridecane 1,3-diamine (H221 available from BASF), 3.0 parts calcium triflate, and heating to about 79° C. to 93° C. to form a solution. The solution was cooled to below about 43° C. and 16.0 parts amine terminated butadiene rubber (ATBN 1300×16 available from B. F. Goodrich Co.) were added. The rubber can be heated as needed to a temperature below about 43° C. to enhance dispersion. Also added were 5 parts amorphous silicon dioxide (GP-71, available from Harbison-Walker Corp.) and 1.0 parts fumed silica (Cab-O-Sil™ TS-720, available from Cabot Corp.) using a high shear mixer.

Adhesives were prepared and tested as described in Examples 3 and 4. Test results are shown in Table 2.

Examples 7 to 22

Part A of a 2 part adhesive composition was prepared as in Example 2. Various catalysts, as shown in Table 2 were added in an amount of 10% by weight of Part A. All of the amine compounds used as part of the catalyst were obtained from Aldrich Chemical Co.

Epoxy adhesives were then prepared as described in Examples 3 and 4. Test results are shown in Table 2.

The data show that a preferred combination of $Ca^{+2}$ salt and tris-2,4,6-(dimethylaminomethyl)phenol yielded a lower total area under the DSC curves. This preferred combination also yielded the most induction reactive adhesive that has the ability to fail cohesively from oily metal substrates in an overlap shear test after oven cure.

TABLE 2

| Ex | Catalyst | Reactivity A/B/C | Amine/Epoxy Ratio | Lap Shear Strength |
|---|---|---|---|---|
| 2 | No Catalyst | A = 1; B = 126 C.; C = 99 J/g | 0.60 | No cure |
| 3 | K-54 only | A = 1; B = 130 C.; C = 161 J/g | 0.60 | 15/A |
| 4 | K-54 only | A = 1; B = 128 C.; C = 105 J/g | 0.30 | 18/C |
| 5 | CaTriflate only | A = 2; B = 113 C., 279 C.; C = 160, 61 J/g, D = 221 J/g | 0.60 | No cure |
| 6 | CaTriflate only | A = 2; B = 114, 307 C.; C = 91, 155 J/g, D = 246 J/g | 0.30 | No cure |
| 7 | CaT + Imidazole | A = 1; B = 129 C.; C = 290 J/g | 0.60 | 13/A |
| 8 | CaT + Imidazole | A = 1; B = 146 C.; C = 296 J/g | 0.30 | 14/A |
| 9 | CaT + 1,4 Diazobicyclo(2,2,2)-octane | A = 2; B = 110 C., 236 C.; C = 259, 8 J/g, D = 267 J/g | 0.60 | 10/A |
| 10 | CaT + 1,4 Diazobicyclo(2,2,2)-octane | A = 2; B = 120 C., 297 C.; C = 223, 30 J/g, D = 253 J/g | 0.30 | 15/M |
| 11 | CaT + 4-Dimethylamino-pyridine | A = 1; B = 139 C.; C = 247 J/g | 0.60 | 2/A |
| 12 | CaT + 4-Dimethylamino-pyridine | A = 2; B = 126, 258 C.; C = 205, 70 J/g, D = 275 J/g | 0.30 | 14/A |
| 13 | CaT + 1,5 Diazobicyclo(4,3,0)non-5-ene | A = 2; B = 125, 286 C.; C = 208, 30 J/g, D = 238 J/g | 0.60 | uncured |
| 14 | CaT + 1,5 Diazobicyclo(4,3,0)non-5-ene | A = 2; B = 125, 327 C.; C = 119, 100 J/g, D = 219 J/g | 0.30 | uncured |
| 15 | CaT + 1,8 Diazobicyclo(5,4,0)undec-7-ene | A = 2; B = 123, 304 C.; C = 193, 40 J/g, D = 233 J/g | 0.60 | 12/A |
| 16 | CaT + 1,8 Diazobicyclo(5,4,0)undec-7-ene | A = 2; B = 121, 322 C.; C = 120, 143 J/g, D = 263 J/g | 0.30 | 2/A |
| 17 | CaT + Dimethylbenzyl-amine | A = 2; B = 120, 303 C.; C = 166, 46 J/g, D = 212 J/g | 0.60 | 12/A |
| 18 | CaT + Dimethylbenzyl-amine | A = 2; B = 120 C., 317 C.; C = 100, 130 J/g, D = 230 J/g | 0.30 | 14/C |
| 19 | CaT + K-54 | A = 3; B = 106, 122, 285 C. C = 150, 15 J/g, D = 165 J/g | 0.60 | 11/A |

TABLE 2-continued

| Ex | Catalyst | Reactivity A/B/C | Amine/Epoxy Ratio | Lap Shear Strength |
|---|---|---|---|---|
| 20 | CaT + K-54 | A = 2; B = 124 C., 311 C.; C = 87, 96 J/g, D = 183 J/g | 0.30 | 17/C |
| 21 | CaT + K-54 | A = 2; B = 124, 300 C.; C = 117, 61 J/g; D = 178 J/g | 0.45 | 14/A |
| 22 | CaT + K-54 | A = 2; B = 117, 362 C.; C = 45, 75 J/g D = 120 J/g | 0.15 | 9/C |

A = Number of peaks
B = Maximum exotherm temperature of each peak
C = Area under each curve (joules/gram)
D = Total area under both curves (J/gram)

What is claimed is:

1. A method of adhering to an oily metal substrate comprising applying a curable, structural epoxy adhesive composition to an oily metal substrate, wherein said curable, structural epoxy adhesive composition comprises two parts, the first part comprising:

(a) an epoxy catalyst comprising:
      (i) a $Ca^{+2}$ salt; and
      (ii) an epoxy polymerization catalyst having the structure of formula (I):

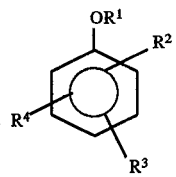

wherein
$R^1$ is H or —$CH_3$
$R^2$ is —$CHNR^5R^6$ and $R^5$ and $R^6$ are independently selected from —$CH_3$ or —$CH_2CH_3$;
$R^3$ and $R^4$ independently may be present or absent, when present $R^3$ and $R^4$ are —$CHNR^5R^6$ and $R^5$ and $R^6$ are independently selected from —$CH_3$ or —$CH_2CH_3$; and (b) an amine curing agent; and the second part comprising an epoxy resin having an average epoxide functionality of greater than one and wherein the stoichometric amine to epoxy ratio of the amine curing agent to the epoxy resin is from 0.2 to 0.9 to 1 and wherein the adhesive composition has an overlap shear strength of at least 9 MPa and exhibits cohesive failure when said composition is applied to oily metal coupons having an emulsified draw lubricated coating weight of 1,500 mg/ft$^2$, cured at room temperature for 24 hours, oven cured for 20 minutes at 163° C., and then equilibrated to room temperature prior to measuring overlap shear strength as measured by the test method LAP SHEAR STRENGTH.

2. The method of claim 1, wherein $R^1$ is H.

3. The method of claim 1, wherein $R^2$ is —$CHN(CH_3)_2$.

4. The method of claim 1, wherein $R^3$ and $R^4$ are present and each of $R^2$, $R^3$, and $R^4$ is —$CHN(CH_3)_2$.

5. The method of claim 1, wherein the structure of formula (I) is tris-2,4,6-(dimethylaminomethyl)phenol.

6. The method of claim 1, wherein the $Ca^{+2}$ salt has a counter ion selected from $NO_3$, $CF_3SO_3$, $ClO_4$, $BF_4$, $SBF_6$, or $CH_3C_6H_4SO_3$.

7. The method of claim 1, wherein the $Ca^{+2}$ salt has a counter ion selected from $NO_3$, $CF_3SO_3$, $CH_3C_6H_4SO_3$ or $ClO_4$.

8. The method of claim 1, wherein the composition comprises a toughening agent.

9. The method of claim 1, wherein the composition comprises a toughening agent selected from amine terminated butadiene copolymers.

10. The method of claim 1, wherein the adhesive composition has an overlap shear strength of at least 0.2 MPa when said composition is applied to oily metal coupons having an emulsified draw lubricant coating weight of 1500 mg/ft$^2$, heated for 5 seconds with a capable induction heating coil to achieve a bondline temperature of about 121° C., and then cured at room temperature for 1 hour.

11. The method of claim 1, wherein the adhesive composition has an overlap shear strength of at least 0.5 MPa when said composition is applied to oily metal coupons having an emulsified draw lubricant coating weight of 1500 mg/ft$^2$, heated for 5 seconds with a capable induction heating coil to achieve a bondline temperature of about 121° C., and then cured at room temperature for 1 hour.

12. The method of claim 1, wherein the adhesive composition has an overlap shear strength as measured by the test method Lap Shear Strength of at least 11 MPa and cohesive failure after oven cure.

13. The method of claim 1, wherein the adhesive composition has an overlap shear strength as measured by the test method Lap Shear Strength of at least 15 MPa and cohesive failure after oven cure.

14. The method of claim 1, wherein the stoichometric amine to epoxy ratio of the amine curing agent to the epoxy resin is from 0.3 to 0.7.

* * * * *

UNITED STATES PATENT AND TRADEMARK OFFICE
CERTIFICATE OF CORRECTION

PATENT NO.: 5,629,380

DATED: May 13, 1997

INVENTOR(S): Baldwin et al.

It is certified that error appears in the above-identified patent and that said Letters Patent is hereby corrected as shown below:

In Column 13, Line 60, please delete "LAP SHEAR STRENGTH" and insert -- Lap Shear Strength --.

In Column 14, Line 40, please delete "a capable" and insert -- an --.

In Column 14, Line 47, please delete "a capable" and insert -- an --.

Signed and Sealed this

Thirtieth Day of March, 1999

Attest:

Q. TODD DICKINSON

Attesting Officer

Acting Commissioner of Patents and Trademarks